April 16, 1968 T. G. CUSTIN 3,378,328

METHOD AND MEANS FOR EXHIBITING SEPARATE
AUDIO-VISUAL RECORDS IN SYNCHRONISM

Original Filed Dec. 27, 1961 2 Sheets-Sheet 1

Inventor
Thomas G. Custin
By Ira Milton Jones
Attorney

Inventor
Thomas G. Custin
By
Attorney 3,378,328

METHOD AND MEANS FOR EXHIBITING SEPARATE AUDIO-VISUAL RECORDS IN SYNCHRONISM

Thomas G. Custin, Rte. 3, Doyle Road, Baldwinsville, N.Y. 13027

Original application Dec. 27, 1961, Ser. No. 162,419, now Patent No. 3,240,329, dated Mar. 15, 1966. Divided and this application Sept. 8, 1965, Ser. No. 485,889
7 Claims. (Cl. 352—31)

This invention relates to talking motion pictures and refers more particularly to a method and apparatus for producing and exhibiting a combined visual-audio recording of the type comprising a conventional motion picture film on which a visual record is carried and a magnetic tape which is separate from the film but interwound therewith and on which a sound record is carried; and the invention relates more particularly to a method and apparatus for producing or for projecting and reproducing, the audio and visual components of such a record simultaneously, so as to achieve a talking motion picture having its sound synchronized with the picture.

This invention is a division of my co-pending application, Ser. No. 162,419, filed Dec. 27, 1961, now Patent No. 3,240,329, in which the combined audio-visual recording is claimed.

Magnetic recording tape has several features that render it especially suitable as a motion picture sound recording medium for amateur use, and even for many professional purposes. The low cost of the tape itself and of the recording and playback equipment used with it, the absence of any requirement for processing between recording and playback, the ease with which erasures and re-recordings can be made, and the flexibility, durability and compactness of magnetic tape are all desirable in a motion picture sound recording medium.

Heretofore, however, where magnetic tape has been used for this purpose it has usually been bonded to the motion picture film, along one side edge portion thereof, in order to insure synchronization of sound and pictures during projection. The bonding of the tape to the film required special processing, usually beyond the facilities of the amateur, but this was not the only disadvantage of securing the tape to the film. Since there is a minimum feasible width for magnetic tape, and it is important that the tape not extend laterally into the picture area of the film, there is a practical lower limit to film size for a composite visual-audio record strip in which magnetic tape is secured to the film. As a rule, therefore, sound motion pictures have not heretofore been available in film sizes below 16 mm.

Since 8 mm. motion picture film is used by the majority of home movie makers, there has been a very substantial unsatisfied demand for sound motion pictures using 8 mm. film for the pictorial record and magnetic tape for the sound record medium.

Some amateurs have of course used magnetic tape and tape playback apparatus in conjunction with their projector to provide background music or a commentary for their films, but they have almost invariably in such cases wished more or less vainly that they could achieve perfect synchronization between the taped sound and the motion picture. While apparatus has been devised for locking a separate tape drive into synchronism with a motion picture projector, such apparatus has heretofore been prohibitively expensive for the amateur and has not enjoyed widespread use.

With the foregoing in mind it is a general object of this invention to provide a composite audio-visual strip record, and a method and apparatus for projecting the same to display a talking motion picture, wherein the visual record comprises motion picture film of any desired width, and the sound record medium comprises standard readily available magnetic tape not secured to the film, and wherein the apparatus includes conventional projection means for the film, a generally conventional transducer or pickup head for the magnetic recording tape, and very simple and inexpensive means for causing the film and magnetic tape to progress through the apparatus in synchronism with one another.

In connection with the object just stated, it is another object of the present invention to provide a method and apparatus for projecting a composite audio-visual strip comprising a motion picture film and a magnetic recording tape which is unattached to the film along its length but which is interwound on the same reel with the film, and for keeping the film and tape synchronized through successive projections and rewindings.

I am aware that the interwinding of separate strip-like audio and visual records on a common reel has been proposed heretofore, notably in De Forest Patent No. 1,843,972, which discloses apparatus intended for use with a record comprising a picture film and a separate sound track film that is interwound on the same reel with the picture film, and in Warren Patent No. 2,962,927, which discloses a projector having an interwound picture film and sound tape on its supply reel. However, the De Forest and Warren patents evidence a lack of appreciation of certain fundamentals which I have discovered and which are essential to the successful operation of apparatus using separate sound and picture strips interwound on a common reel.

When two strips of motion picture film or other substantially inelastic and similar materials are interwound on a supply reel, with layers of one strip alternating with layers of the other, each convolution of the outer strip must have a slightly greater circumferential length than the convolution of the other strip which it directly overlies, due to the slightly greater radius on which the outer strip is wound. Hence the strip that has its convolutions outermost must have a greater total length than the inner one, and as the supply reel rotates the two strips will come off of it in unequal lengths. Unless the strips are progressed through the projector at unequal speeds (an arrangement that would require elaborate synchronizing apparatus) the shorter strip will control the speed of rotation of the supply reel, and the longer will fall slack as it comes off of said reel.

If the two strips are arranged in synchronized relation on the supply reel, synchronization will of course be lost as soon as such slack develops. Subsequent rewinding of the strips from the takeup reel back onto the supply reel will merely aggravate their unsynchronized relationship unless some highly specialized rewinding arrangement is employed.

The present invention contemplates the projection and rewinding of a composite visual-audio record comprising a motion picture film and a magnetic sound tape which is separate from the film but interwound therewith on a common reel, and in overcoming the problems heretofore posed by that arrangement this invention takes advantage of the elasticity which is inherent in certain widely used types of magnetic recording tapes, namely those having a polyester base. It is of the essence of the invention that the tape and motion picture film be so interwound on the reel that the tape is always outermost in each convolution of the composite film-tape record strip, and that the tape is under greater lengthwise tension than the film. Because of the tension under which it is maintained on the reel and its greater elasticity, the tape, although having the same length as the film when unstretched, is stretched on the reel to a greater length than the film, and thus accommodates itself to the larger radii on which it is wound.

When the tape is drawn off of the reel it of course resumes very promptly its normal unstretched length, and hence assurance is had that equal lengths of tape and film will pass through the projection apparatus in a given time, thereby producing perfectly synchronized sound and pictures.

Bearing in mind these essential requirements of the composite strip record, it is another object of this invention to provide projection apparatus for displaying such a record wherein the film and tape are progressed through the apparatus along separate paths which respectively carry them past projection means and a tape pickup head, but are at all times drawn along their paths at equal linear speeds so as to be maintained in synchronized lengthwise relationship to one another, and whereby the film and tape are recombined in interwound relationship on a takeup reel, with the tape again outermost and under tension and still in synchronized lengthwise relationship to the film.

Another object of this invention, providing a feature having particular appeal to amateurs, resides in the provision of apparatus for projecting film and tape that are interwound on a supply reel in the manner described, through which apparatus both film and tape can be threaded very simply and easily, in a generally conventional manner, and which apparatus also makes possible the rewinding of film and tape from the takeup reel onto the supply reel in a generally conventional manner.

Thus it is a further object of this invention to provide unusually simple and inexpensive projection apparatus, particularly well suited for use by amateurs and excellently adapted for use with the popular 8 mm. film, whereby a magnetic sound recording, made either during or after photography, can be automatically run in perfect synchronism with a motion picture record on film, and can be maintained in such synchronism despite repeated projections and rewindings.

Another object of this invention resides in the provision of a sound motion picture apparatus of the character described that incorporates very simple means for constraining motion picture film and magnetic sound recording tape to move at identical linear speeds through the apparatus, from a supply reel on which they are interwound and onto a takeup reel on which they are again interwound, and by which the tape is tensioned as it moves onto the takeup reel to stretch it to the extent necessary to cause it to feed smoothly onto the takeup reel and maintain its pre-established lengthwise relationship with the film.

For many purposes it is satisfactory to prepare a sound record intended to accompany a motion picture after the motion picture film has been exposed and developed, the sound being recorded during projection of the film. It will be apparent from what has been said above that the motion picture projector of this invention lends itself very well to this manner of preparing a sound record, providing the magnetic transducer or pickup head in the projector is selectively reconnectable for either recording or playback, as is usually the case.

However, the principles of the invention are also applicable to a sound motion picture camera in which the sound record is made simultaneously with exposure of motion picture film; and it is thus another object of this invention to provide a method and apparatus for producing a composite audio-visual strip of the character described, capable of being embodied in a camera having a very simple mechanism and which can be very light and compact even though such camera includes all of the necessary sound recording equipment.

With the above and other objects in view which will appear as the description proceeds, this invention resides in the novel method and construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
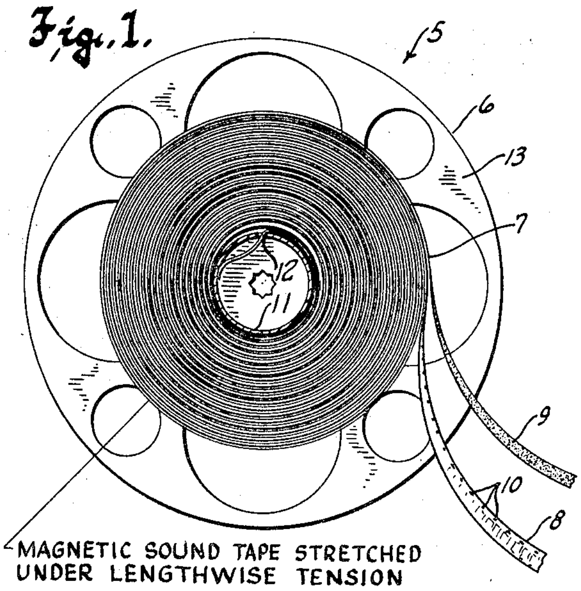
FIGURE 1 is a more or less diagrammatic cross-sectional view of a reel on which are interwound separate strips of motion picture film and magnetic tape comprising the composite audio-visual strip of this invention.
Figure 3:
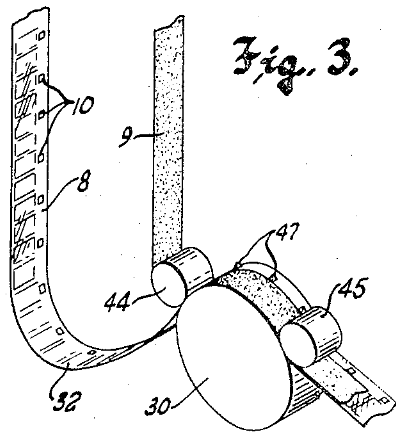
FIGURE 3 is a detail perspective view on an enlarged scale of the sprocket wheel of the projector shown in FIGURE 2, illustrating how the film and tape are trained thereover.

Referring now more particularly to the accompanying drawings, the numeral 5 designates generally an audio-visual record of this invention comprising generally a reel 6 upon which is wound a composite strip 7 consisting of a length of motion picture film 8 and a length of magnetic recording tape 9. The motion picture film is in all respects conventional, and may have any desired width, from the popular 8 mm. size upwardly. The film is of course provided with sprocket holes 10 that are spaced at regular intervals along its length, in a predetermined relationship to each pictorial frame on the film, and by which the film is advanced lengthwise through a projector when being exhibited.

The magnetic recording tape 9 is likewise of a readily available commercial type, but is of a stock which has a substantial degree of elasticity. Polyester base magnetic tape (sometimes appearing under the trademark "Mylar") possesses the necessary elasticity, and generally the thinnest polyester base tape is the most satisfactory for the purposes of this invention, since it stretches most easily. Thus ½ mil "Mylar" base tape has afforded excellent results in practice, although 1 mil polyester base tape has also been found satisfactory. The magnetic tape can be modified if desired, by the provision of lengthwise spaced apart sprocket holes 10' (see FIGURE 5) corresponding in dimensions and spacing to the sprocket holes in the film. However, it is preferred to use imperforate tape in exactly the form in which it is supplied commercially.

The reel 6 upon which the composite strip 7 is wound is likewise a conventional motion picture film reel, having a hub 11 provided with a slit 12 in which the inner end of a film can be engaged, and side flanges or discs 13 which engage the edges of film being wound onto the hub to guide the film smoothly onto the reel so that it forms a compact coil. In this case the magnetic tape 9 and motion picture film 8 are interwound on the reel so that layers of film and tape alternate from the hub of the reel outwardly, and both can have their inner end portions engaged in the slit 12.

The record carrying portions of the film and tape are of equal length when the tape is unstretched. Obviously both film and tape can have such lengths of unrecorded leader at one or both ends as may be desired to facilitate threading them through a projector and as may be necessary to start them through the projector in synchronism.

The composite strip 7 is so wound on the reel 6 that the tape portion associated with a given part of the film lies radially outwardly of the film in each convolution on the reel and hence embraces a slightly greater circumference. By reason of the construction of the projection apparatus, hereinafter described, with which the record 5 is used, the tape on the reel 6 is under a substantial degree of lengthwise tension, sufficient to stretch it to the extent necessary to compensate for the slightly greater radii on which it is wound. Hence the composite strip lies very smoothly on the reel, with no gaps or bulges that might cause the tape and film to lose synchronism during their progress through the projector. Friction between the tape and film is entirely adequate to prevent the tape from returning to its normal unstretched length when it is coiled on the reel even though the outer ends of the film and tape may be free.

The projector 20 used with the record 5 for exhibiting the latter is in many respects conventional. It includes a suitable supply reel support 21 on which a supply reel 22 can be detachably mounted for substantially free rotation, and a takeup reel support 23 on which a takeup reel 24 can be readily detachably mounted.

Motion picture film drawn off of a supply reel on the supply reel support passes through generally conventional projection means 25 in the machine that includes the usual geneva movement or the like by which the film is advanced one frame at a time, in a series of rapid intermittent movements, through a film gate 27 and between a lamp 28 and a lens 29. A suitable motor (not shown) drives the geneva movement and the usual shutter (not shown) associated therewith, and also drives sprocket wheels 30 and 31 over which the film is trained.

The sprocket wheels 30 and 31 are rotated at a steady rate which is synchronized with the rate of motion of the geneva movement. The sprocket wheel 31, which is located along the path of film movement between the supply reel and the film gate, serves to draw film off of the supply reel and thus relieves film tension on the geneva movement. Since this sprocket wheel progresses the film at a smooth, steady rate, but the film advances through the film gate in a series of rapid jerks, conventional slack film loops 32 are formed above and below the film gate when the film is threaded therethrough, the projector being provided with any conventional guide means (not shown) for defining loops of the proper size.

At this point it should be observed that the sprocket wheel 30 is rotated at the same rate as the sprocket wheel 31 and in synchronism with the rate of motion of the geneva movement, and that the takeup reel 24 is driven, through a belt clutch 33 or the like, in such a manner that film tends to be drawn onto the takeup reel at a faster linear speed than the sprocket wheel 30 allows it to advance. The retarding effect thus exerted by the sprocket wheel 30, through the film, holds down the rotational speed of the takeup reel to exactly that required to pick up the film as fast as it comes out of the projector, but imposes a tension upon the film as it goes onto the takeup reel which insures that the film will lie smoothly on the reel, with each convolution snugly flatwise overlying the one therebeneath, and with no gaps or bulges in the coil being wound onto the reel.

The projector 20 also includes a conventional transducer or magnetic tape head, generally designated 36, which can have the usual erase and recording gaps, the latter serving also for playback. A pressure pad 37 opposite the transducer urges tape into running engagement therewith in a known manner. It will be understood that the transducer or head 36 is connected with an amplifier and a speaker, neither of which is shown.

From the supply reel 22 to the sprocket wheel 30 to the magnetic tape element 9 of the opposite audio-visual strip 7 follows a path through the projector which is separate from that traversed by the film element; and of course the path of the tape takes it through the transducer 36. As it comes off of the supply reel the tape preferably first passes over a series of idlers 39, which are mounted at fixed locations on the projector so spaced apart as to insure that the paths of film and tape between the supply reel and the sprocket wheel 30 will be of equal lengths. This allows equal lengths of starting leader to be used on the film and tape. To the same end the tape head is preferably so located on the projector that the distance along the path of tape travel from the supply reel to the head is equal to the distance along the film path from the supply reel to the projector means 25.

Attention is directed to the fact that the idler 39' which is nearest the supply reel along the path of tape travel is so located that the composite strip comes off of the supply reel with the tape always radially outermost, this being an essential feature of the present invention which in part accounts for the successful synchronization of sound and pictures as the tape and film move along their separate paths through the machine.

After moving across the idlers 39 and through the head 36, the tape can be twisted through 90° and carried around one side of the lens and film gate, as at 40. A suitable idler 41 or a smooth trough-like stationary guide element can be provided for this purpose. The tape then passes across another guide element 42 by which it is untwisted, and is thence trained around the sprocket wheel 30, flatwise overlying the film trained thereover.

Preferably, guide idlers 44 and 45 are mounted at substantially diametrically opposite sides of the sprocket wheel 30, and the tape and film are trained under them to insure an adequate wrap of tape and film around the sprocket wheel.

The tape traverses the sprocket wheel 30 alongside the sprocket teeth thereon, and thus overlies the main body of the film on which the pictorial frames are carried, with the tape in good surface-to-surface engagement with the film. This relationship of film and tape on the sprocket wheel is noteworthy, since it affords a frictional drive by which the film draws the tape through the head 36 at a lineal speed which is always and necessarily equal to the lineal speed at which the film is progressed by the sprocket wheels, thus insuring the perfect synchronization of sound and pictures that is one of the objects of this invention. The frictional drive between the film and tape also allows the sprocket wheel 30 to hold back the tape, against the tendency of the takeup reel to draw it along at a faster linear speed than that at which the sprocket wheel allows it to progress, thus tensioning the tape as it goes onto the takeup reel.

The tape, like the film, moves directly onto the takeup reel 24 from the sprocket wheel 30. It is another essential feature of the projector of this invention that the composite strip goes onto the takeup reel with the tape outermost. This arrangement insures that in each convolution of the composite strip on the takeup reel the tape will be wound on a slightly greater radius than the film. The necessary additional length of tape to accommodate it to this larger radius is of course obtained by lengthwise stretching of the tape as it goes from the sprocket wheel 30 onto the takeup reel, due to the tension to which the tape is subjected by the takeup reel and the sprocket wheel 30.

It will be noted that the cooperation between the sprocket wheel 30 and the takeup reel 24 automatically maintains the tape tension force at just the required value to effect the exact amount of tape stretch required for smooth winding, so that the tape and film are wound onto the takeup reel with their lengthwise corresponding portions in the same relation to one another that they came off of the supply reel.

Figure 4:
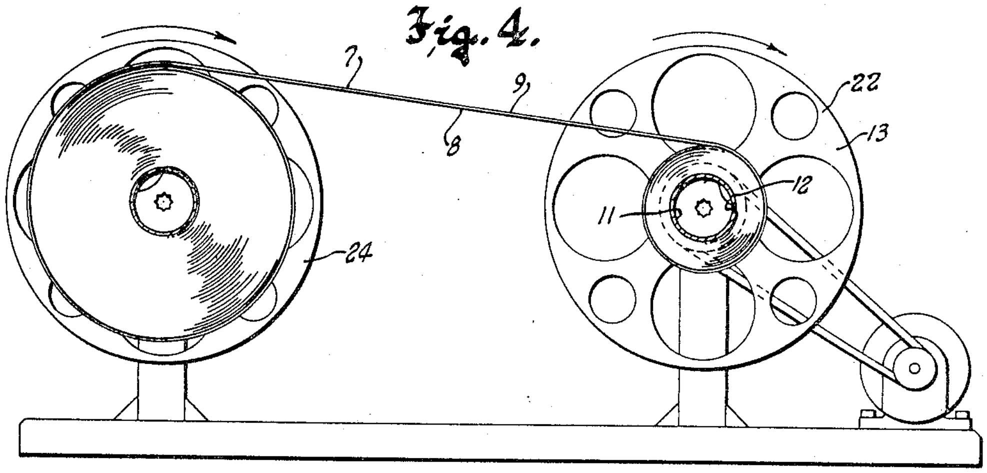
FIGURE 4 is a more or less diagrammatic side elevational view of rewind apparatus that can be used with the audio-visual record shown in FIGURE 1 and the projector illustrated in FIGURE 2, portions of the reels being broken away.

Rewinding of the composite strip is accomplished in the conventional manner illustrated in FIGURE 4, which shows a rewind mechanism suitable for use with the audio-visual record of this invention. While illustrated as a separate mechanism, the rewind device obviously could (and usually would) comprise the projector itself, with its drive mechanism reconnected for rewinding in a completely conventional manner.

In any event the rewind mechanism must be so arranged that the composite strip comes off of the takeup reel with the tape outermost and goes onto the supply reel with the tape still outermost. In this way the required stretch is imparted to the tape as it is rewound onto the supply reel, so long as the film is under some slight tension as it moves from one reel to the other. In most cases such tensioning of the film is effected automatically during rewinding because only the supply wheel is rotatably driven, the film is relied upon to drive the takeup reel, and the takeup reel is steadily and constantly accelerated during the rewinding process as the diameter of the coil thereon decreases while the diameter of the coil on the supply reel is increasing. Inasmuch as the film is thus tensioned during rewinding, the tape will be likewise subjected to the required amount of lengthwise tension, and this will occur automatically even though the rewinding process is completely conventional.

The conventional rewinding operation made possible by this invention is another feature which particularly commends it to amateurs, since it requires no change in the rewinding practices and habits to which they have become accustomed with silent film.

Initially, for recording a sound program on the tape, the tape and exposed, developed film can be fed into the projector from separate reels to be interwound on the takeup reel. Thereafter the film and tape will of course remain in properly synchronized relationship during subsequent rewinding and projection.

Preferably the start and finish end portions of the tape and film are detachably secured together, as by means of pressure sensitive tape or the like, so that the film and tape will always be in the desired lengthwise relationship to one another that maintains synchronization of the sound and picture records. If the projector is arranged to allow the film and tape to be inserted edgewise into the several guides and rollers through which they are threaded, as is a common practice, a "leader" of the composite strip can then be readily drawn off of the supply reel and caught in the slot 12 in the hub of the takeup reel, after which the film and tape, in that order, can be separately threaded through the projector mechanism. Adhesion to one another of the finish ends of the film and tape strips similarly facilitates rewinding because the composite strip can be handled as a unitary length of material in fastening the trailing ends back into the supply reel.

Figures 2, 5:
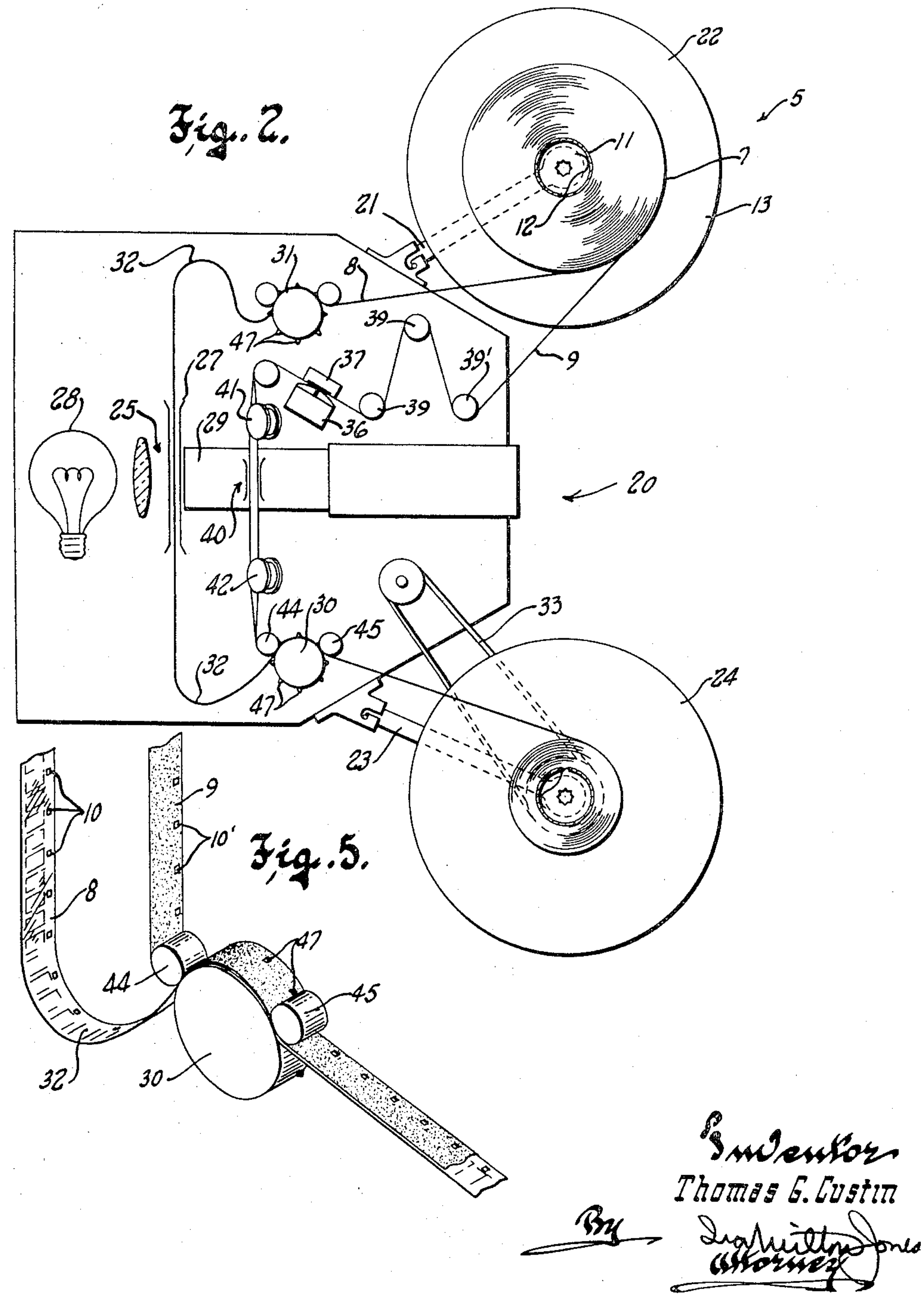
FIGURE 2 is a diagrammatic side elevational view of sound motion picture projection apparatus embodying the principles of this invention and suitable for use with the audio-visual record shown in FIGURE 1.
FIGURE 5 is a view similar to FIGURE 3 but illustrating a modified embodiment of the invention.

As illustrated in FIGURE 5, the magnetic tape can be provided with lengthwise spaced apart sprocket holes 10' near one side edge thereof, adapted to be engaged by the teeth 47 on the sprocket wheel 30. Obviously such perforated tape could be trained over a separate sprocket wheel rotatably driven in synchronism with that over which the film is trained. Other simple arrangements for constraining the tape and film to move toward the takeup reel at equal linear speeds will readily occur to those skilled in the art.

It will be apparent that the principles of the projector illustrated in FIGURE 2 are readily applicable to a camera in which unrecorded tape and unexposed film are interwound on a common supply reel and pass to a common takeup reel upon which they are again interwound. The tape head itself and the amplifier required for it can be very simple, light and compact when built in accordance with known designs, and only a relatively small battery pack would be required for electric power for the sound recording equipment. Such a camera would obviously have little more weight and bulk than a silent camera for the same size film. Obviously the interwound sound and tape on the takeup reel would have to be separated during development of the film, but they could be readily recombined in a projector, as pointed out above, without the slightest loss of synchronism.

To avoid the necessity for separating the film and tape in the film processing laboratory, the two could be wound onto separate takeup reels in the camera, at some expense of compactness; and if compactness were a less important consideration than the utilization of completely standard commercially available material the camera could also provide for separate supply reels of film and tape. In any event, it is only necessary that some means be provided in the camera for progressing film and tape therethrough at the same linear speeds, and such means can be identical with those herein disclosed for accomplishing the same result in a projector.

From the foregoing description taken together with the accompanying drawings it will be apparent to those skilled in the art that this invention provides a composite audio-visual record wherein the sound record medium consists of commercially available magnetic tape and the picture record medium consists of ordinary motion picture film of any desired size with which the tape is interwound on a common reel, but which is otherwise separate from the tape. It will also be apparent that the projector apparatus of this invention, for exhibiting said audio-visual record, is relatively very simple and inexpensive, being basically a modification of a conventional motion picture projector to which has been added a suitable magnetic tape head and suitable means for guiding tape along a path separate from that followed by the film, from a supply reel, through the pickup head, to a point at which the tape and film are together fed onto a takeup reel in the proper relationship. Thus the present invention affords a talking motion picture apparatus which is in every respect well adapted to the amateur but which, despite its simplicity and low cost, is nevertheless suitable for many professional purposes.

What is claimed as my invention is:

1. In combination with sound motion picture apparatus of the type comprising a transducer head for magnetic tape sound recordings and film guiding and advancing means for moving motion picture film along a defined path from a supply reel, through means for intermittently moving the film past a lens, and onto a takeup reel:

(A) tape drive means synchronized with the film advancing means for constraining magnetic tape to move along a defined path from the supply reel through the transducer head and to the takeup reel at the same linear speed at which film moves from the intermittent motion means to the takeup reel;

(B) tape draw-off guide means defining a path for magnetic tape interwound on the supply reel with film, along which path tape moves, separately from film, from the supply reel through the transducer head and to the tape drive means, the path defined by said tape draw-off guide means being outwardly relative to the supply reel from the path followed by film leaving the supply reel; and (C) tape windup guide means defining a path along which tape moves from the tape drive means to the takeup reel and which path lies outwardly relative to the takeup reel from the path of film being wound thereonto, so that the tape can be interwound with film on the takeup reel, and as a result of being wound outermost be tensioned lengthwise to a greater extent than the film.

2. The apparatus of claim 1, further characterized by the fact that said tape drive means comprises a member having a curved surface over which film moving from the intermittent motion means to the supply reel can be trained and over which magnetic tape can be trained in frictional surface-to-surface contact with film, with the tape radially outermost, so that the tape is drawn around said surface by the film therebeneath, and at the same linear velocity as the film.

3. The apparatus of claim 1, wherein said member comprises a rotatably driven sprocket roller comprising a part of the film advancing means, having teeth adapted to engage in sprocket holes in film, and by which the film is constrained to move from the intermittent motion means to the takeup reel at a substantially uniform linear velocity.

4. The apparatus of claim 1, wherein said tape drive means comprises a sprocket roller having teeth engageable in regularly spaced sprocket holes in magnetic tape, and means for rotatably driving said sprocket roller in synchronism with the film advancing means.

5. In combination with motion picture apparatus having supports for a supply reel and a driven takeup reel and means defining a path along which motion picture film is moved from a supply reel on the supply reel support to a takeup reel on the takeup reel support, by way of intermittent motion means and a steady motion sprocket wheel by which the film is constrained to move lengthwise at a substantially constant rate such that it is wound onto the takeup reel under tension:

(A) a magnetic tape transducer head;

(B) means for constraining tape to move lengthwise through the transducer head at the same linear speed at which the sprocket wheel drives the film, so that the passage of tape through the transducer head is at all times synchronized with the passage of film through the projection means;

(C) tape draw-off guide means defining a path for magnetic tape from a supply reel on the supply reel support through the transducer head and to the drive means, which path is separate from that for film and lies outwardly of the film path adjacent to the supply reel; and (D) tape rewinding guide means for conducting tape along a path from the tape drive means to a takeup reel on the takeup reel support, which path lies outwardly of the takeup reel relative to the film path so that the tape and film are rewound on the takeup reel in interwound relationship with the tape outermost and therefore under a greater lengthwise tension than the film so as to be stretched to accommodate the tape to the greater radii on which it is wound.

6. The motion picture film projection apparatus of claim 5, further characterized by the fact that said means for constraining the tape to move at the same linear speed at which the sprocket wheel moves the film comprises a portion of the tape guide means by which tape is trained over the sprocket wheel to ride upon the outer surface of film trained thereover, so that the tape is drawn along said defined tape path by its frictional engagement with film.

7. The method of transferring from one reel to another a composite audio-visual record that comprises a motion picture film carrying a pictorial record and a magnetic sound tape having substantial elasticity and which is interwound with the film on said one reel with layers of tape and film alternating and the convolutions of the tape outermost, and with the tape under such tension that it is stretched to the extent necessary to accommodate the larger diameters on which it is wound so that corresponding portions of the tape and film have equal lengths and are in a predetermined lengthwise relation to one another along their convolutions, said method comprising:

(A) withdrawing the tape and film simultaneously from said one reel, both at the same rate and with the tape outermost;

(B) winding the film onto said other reel at the same rate that it is withdrawn from the first mentioned reel, and while maintaining tension on it;

(C) simultaneously with winding the film onto said other reel, winding the tape onto said other reel in convolutions which alternate with those of the film and are outward of them; and (D) constraining the tape to move onto said other reel at the same linear speed as the film, so that as the tape goes onto said other reel it is tensioned and elastically stretched to the extent necessary to accommodate the larger diameters on which its convolutions are wound, to thereby provide for the maintenance of said predetermined lengthwise relationship between corresponding portions of the tape and film.

References Cited

UNITED STATES PATENTS

| | | | |
|---|---|---|---|
| 1,843,972 | 2/1932 | De Forest | 352—31 |
| 2,962,927 | 12/1960 | Warren | 352—34 |

JULIA E. COINER, *Primary Examiner.*

UNITED STATES PATENT OFFICE

CERTIFICATE OF CORRECTION

Patent No. 3,378,328 April 16, 1968

Thomas G. Custin

It is certified that error appears in the above identified patent and that said Letters Patent are hereby corrected as shown below:

Column 5, line 71, cancel "to", second occurrence; line 72, "opposite" should read -- composite --.

Signed and sealed this 9th day of September 1969.

(SEAL)

Attest:

Edward M. Fletcher, Jr.

Attesting Officer

WILLIAM E. SCHUYLER, JR.

Commissioner of Patents